United States Patent [19]

Glenn

[11] Patent Number: 5,595,595
[45] Date of Patent: Jan. 21, 1997

[54] AQUAGEL-BASED LIGHTWEIGHT CONCRETE

[75] Inventor: Gregory M. Glenn, American Canyon, Calif.

[73] Assignee: The United States of America as represented by the Secretary of Agriculture, Washington, D.C.

[21] Appl. No.: 515,502

[22] Filed: Aug. 15, 1995

[51] Int. Cl.$^6$ .......................... C04B 24/10; C04B 38/00
[52] U.S. Cl. .................... 106/672; 106/674; 106/677; 106/724; 106/730; 106/802; 106/804; 106/823; 524/2; 524/650
[58] Field of Search .................... 106/672, 674, 106/677, 724, 729, 730, 802, 804, 810, 823, 728; 524/2, 650, 5

[56] References Cited

U.S. PATENT DOCUMENTS

| | | | |
|---|---|---|---|
| 3,847,630 | 11/1974 | Compernass et al. | 106/90 |
| 3,989,534 | 11/1976 | Plunguian et al. | 106/674 |
| 4,019,919 | 4/1977 | DeSalvo | 106/90 |
| 4,210,457 | 7/1980 | Dodson et al. | 106/97 |
| 4,277,355 | 7/1981 | Farcnik | 252/62 |
| 4,883,535 | 11/1989 | Hamaguchi et al. | 524/5 |
| 4,900,359 | 2/1990 | Gelbman | 106/86 |
| 5,185,039 | 2/1993 | Hamaguchi et al. | 106/728 |
| 5,207,830 | 5/1993 | Cowan et al. | 106/672 |

OTHER PUBLICATIONS

S Mindess and J. F. Young, *Concrete*, Prentice–Hall, Inc. Englewood Cliffs, New Jersey (1981), pp. 581–596 no month.

Primary Examiner—Mark L. Bell
Assistant Examiner—Michael Marcheschi
Attorney, Agent, or Firm—M. Howard Silverstein; John D. Fado; Margaret A. Connor

[57] ABSTRACT

The present invention is directed to concrete compositions prepared using firm aqueous gels (aquagels) as all or part of the aggregate in a concrete mix. The concrete sets around the aquagels in the initial set stage. Because the aquagels maintain the pore structure of the concrete while it sets, a concrete product can be obtained that has substantially uniform density regardless of depth. During the curing and/or drying stages, the moisture migrates out of the concrete and the aquagels, and the aquagels dry to a fraction of the size of the original aquagel in the cell or pore in the concrete. This results in cellular, lightweight concrete having reduced density, reduced weight, reduced thermal conductivity, and reduced sound transmission compared to concrete prepared without using aquagels.

8 Claims, 2 Drawing Sheets

AQUAGEL-BASED LIGHTWEIGHT CONCRETE

BACKGROUND OF THE INVENTION

1. Field of the Invention

The present invention relates to aquagel-based concrete. More particularly, the invention relates to a lightweight, cellular, concrete which is prepared using aquagels. Methods of making the concrete and uses thereof are encompassed by the invention.

2. Description of the Art

Concrete is a composite material which is generally prepared using a material which forms a hard matrix (the cement or binder), a coarse granular material (the aggregate or filler), and water. Lightweight concretes can be categorized into ultra lightweight concretes useful for nonstructural purposes and structural lightweight concretes. ACI Committee 213 divides lightweight concrete into three categories on the basis of strength and unit weight: (1) low density, low strength concrete which is useful for insulation purposes; (2) moderate density, moderate strength concrete which is useful for concrete block and other applications where moderate strength is desired, and (3) structural lightweight concrete (*Journal of the American Concrete Institute*, 64:433–469 (1967)). [For a detailed discussion of lightweight concretes, see *Concrete* by S. Mindess and J. F. Young, Prentice-Hall, Inc. Englewood Cliffs, N.J. (1981), pages 581–596.]

Concrete density is generally related to the porosity (size and number of pores) within the concrete, including the porosity in the concrete matrix and porosity of the aggregate material, with the lowest density concrete generally having the highest porosity. One way to make low density concrete is to incorporate a lightweight aggregate. A problem associated with lightweight aggregate is its availability. Cinders from ash heaps at coal burning power plants have been used; however, with the decreased number of coal burning furnaces, kilns, and other facilities there is a limited supply of ash available. Other lightweight aggregates have been produced from slate, clays, shale, fly ash, or pumice, which are produced in kilns or sintering machines. These low density aggregates may function well; however, they are becoming increasingly expensive with increased material, fuel, and labor costs. Additionally, lightweight aggregate produced in kilns require expensive and cumbersome machinery and create air pollution which is undesirable. Dross is a byproduct of iron and steel production. Hot dross can be expanded by placing it in contact with water. Since dross is a byproduct, it is economical to use as a lightweight aggregate but it is not uniform in its properties which makes it difficult to achieve good quality control.

Another way to make low density, lightweight concrete has been to entrain gas or air or some type of an expanded particle as a portion or all of the aggregate. This has been carried out by various means, including incorporating air pockets into the concrete such as by whipping air into the concrete mix, by adding air-bubble-containing foam to a concrete mix, or by adding chemical substances which upon application of heat and/or reaction liberate a gas, e.g., foaming agents; or by incorporating expanded particles, such as polystyrene beads, into the cement. Some problems are associated with these technologies. For example, in the case of cellular concrete prepared using a foam containing small air bubbles, the concrete sets around the air bubble forming a concrete matrix with small voids or cells. Problems with this technique are that the air bubbles can escape from the concrete during mixing and pouring, the bubbles may coalesce forming large voids, the concrete may have non-uniform density throughout its profile with greater density near the bottom, the concrete must be poured shallow since hydrostatic pressure will compress the bubbles and affect concrete density, and the concrete may shrink and crack as it hardens. Additionally, to make cellular concrete requires special equipment. In the case of concrete prepared with polystyrene beads as a lightweight aggregate, one problem is that the beads tend to float to the surface of the concrete so it is difficult to get uniform density throughout the concrete. Additionally, polystyrene beads are made of plastic, a nonrenewable resource.

Further methods for preparing lightweight concrete or lightweight aggregate include using a colloidal solution or sol-gel composition of traditional aggregate materials such as bentonite, or by incorporation of polyethylene particles have been described. For example, U.S. Pat. No. 4,900,359 reports the preparation of a cellular concrete by adding a colloidal suspension of sodium bentonite, peptized calcium bentonite or attapulgite in water or a suspension of a gelled silica based sol-gel in water to a cellular concrete mix before the addition of an air-bubble foam composition including a foam-making agent. A problem with this technology is the same as that associated with bubble-foaming concrete mixes, namely, that the deeper the concrete is poured, the greater the hydrostatic pressure which can eventually compress the bubbles to only a fraction of their original volume. This hydrostatic pressure makes these concretes more dense at the bottom; the deeper the concrete, the greater is the problem.

U.S. Pat. No. 4,019,919 reports a full strength, reduced density concrete prepared by using polyethylene particles having irregular, roughened surfaces, as either part or all of the aggregate in the cement. The problem with polyethylene particles in concrete mixes is that plastic is less dense than concrete and tends to float to the surface of the concrete, thereby making it difficult to get uniform density. Further, polyethylene is typically derived from petroleum which is a non-renewable resource.

SUMMARY OF THE INVENTION

The present invention is directed to a concrete composition prepared with an aggregate phase comprising aquagels. In particular, the invention comprises cellular concrete which is prepared by mixing firm aqueous gels (aquagels) into the concrete mix as all or a part of the aggregate in the mix. The cement sets around the aquagels, and the aquagels maintain the formation of the pores or cells during the stage when the concrete becomes firm (initial set). During the curing and/or drying stages, the moisture migrates out of the concrete and the aquagels; as an aquagel loses moisture, it shrinks and eventually dries up to form a dried bead or particle that is a fraction of the size of the original aquagel in the cell or pore in the concrete. This results in cellular, lightweight concrete.

Compositions prepared in accordance with the methods of the invention have reduced density, reduced weight, reduced thermal conductivity, and reduced sound transmission compared to concrete prepared without using aquagels. Because the aquagels in the concrete mix maintain the pore structure of the concrete mix while the cement sets, a concrete product can be obtained that has substantially uniform density regardless of depth.

The aquagel concrete mix is also desirable since it maintains a substantially constant volume during the curing period, minimizing shrinkage. In contrast, lightweight concretes containing the conventional aggregate, perlite, and cellular concretes tend to shrink as the concrete hardens and cures.

The initial concrete mix containing aquagels has a high moisture content. This can be advantageous for certain applications. Concrete having a high initial moisture content will dry more slowly than regular concrete. This can be an advantage where the concrete is poured in hot, dry conditions that cause normal concrete to dry too quickly. The high moisture concrete would remain cooler due to evaporative cooling and would not dry out so quickly. Concrete that dries too quickly does not cure properly. Other applications for which a high initial moisture content may be advantageous will be apparent to those of skill in the art.

Another use of the invention is applications where the high moisture content is maintained in the aquagels in the concrete.

The cellular concrete of the invention can be prepared from any material which can form a firm aquagel, that is, an aquagel that is sufficiently firm to withstand the shear forces that occur during concrete mixing. Such materials include those which are obtained from renewable resources, including starch, agar, and alginic acid.

In accordance with this discovery, it is an object of the invention to provide lightweight concrete which is prepared using aquagels.

Another object of the invention is the provision of concrete products having a high initial moisture content, and which, after curing and drying have substantially uniform density, and reduced density, reduced weight, reduced thermal conductivity, and reduced sound transmission compared to concrete prepared without using aquagels. Further, the concrete products have reduced shrinkage during drying compared to concrete prepared using perlite as the aggregate.

A further object of the invention is the provision of methods of preparing the concrete products of the invention.

An even still further object of the invention is to provide lightweight concrete useful for a multitude of purposes, including for lightweight concrete blocks, for insulating concretes, for steel fireproofing, for structural concrete, for roofing or flooring, for making green wall, for insulated sidewalks or patio decks, or for coating on other concrete surfaces to reduce evaporation of the underlying concrete.

Other objects and advantages of the invention will become readily apparent from the ensuing description.

DETAILED DESCRIPTION OF THE INVENTION

Figure 1:
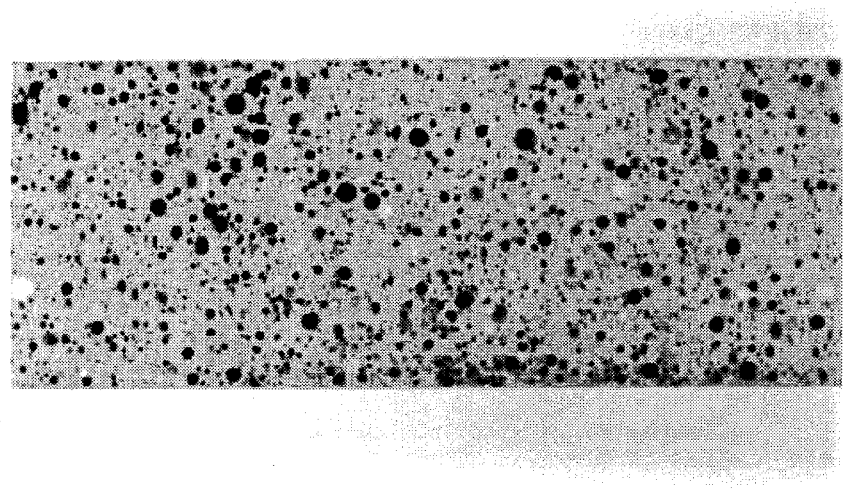
FIG. 1 is a photograph of a cross-sectional cut through concrete prepared using high amylose starch spherical aquagels in proportions given in Table 2, high amylose corn starch 4. The mechanical and physical properties of the concrete are shown in Table 1. The concrete has spherical voids left by the starch aquagels that have dehydrated.

The present invention provides novel cellular concrete compositions prepared using firm aqueous gels (aquagels) as all or part of the aggregate in the concrete. For purposes of this invention, the term "aquagel" is defined to mean an aqueous gel which has sufficient rigidity development (solidification) such that the aquagel-forming material sets into a firm aqueous gel. "Firm" with relation to aquagel means that the aquagel is sufficiently firm to withstand the shear forces that occur during mixing of the concrete, that is, the aquagel remains substantially intact during the mixing. Thus, the cement in the mix sets around an aquagel, and the aquagels maintain the formation of the surrounding pore or cell during the stage when the concrete becomes firm (initial set). The initial set is that point where the concrete no longer freely flows, but maintains its shape.

For purposes of this invention, the term "cellular" means that the concrete has a solid matrix having cells or pores which contain a vacuum, air, and dried aquagels or "wet" aquagels, or combinations of the foregoing. If desired, the size and/or uniformity of the pores or cells in the concrete can be regulated by preparing the concrete using aquagels having a desired size and/or shape.

Any material that will form a firm aquagel is encompassed by the invention. Exemplary of such materials are the following: (1) Starch, including (a) unmodified starch such as obtained from any agricultural starch-producing crop, including wheat, corn, rice, potato, peas, tapioca, and other grains and vegetable starches, and including high amylose starch; (b) modified starch, that is, starch that has been modified by hydrolysis or dextrinization, or has been modified to change the chemical structure of some of the D-glucopyranosyl units in the molecule such as by oxidation, esterification or etherification; (c) mixtures of different unmodified starches; (d) mixtures of different modified starches, and (e) mixtures of unmodified and modified starches. (2) Agar. Agar is a polysaccharide complex extracted from agarocytes of algae of Rhodophyceae. Predominant agar-producing genera are Gelidium, Gracilaria, Acanthopeltis, Ceramium, and Pterocladia. (3) Alginic Acid. Alginic acid is a hydrophilic, colloidal polysaccharide obtained from seaweeds which, in the form of mixed salts of calcium, magnesium, and other bases, makes up a large portion of cell walls. It is composed of polymannuronic acid and has a molecular weight of about 240,000 daltons.

The following is a description of preparation of aquagels for use in preparing lightweight concrete. The aquagel-forming material is treated to form a firm aquagel. For example, in the case of starch, aquagels can be prepared by mixing the starch with water, gelatinizing the starch, forming the gelatinized starch into the desired shape, e.g., spheres, and cooling or aging the gelatinized starch to cause gelation and form aquagels. In an alternate procedure, the starch is mixed with water, gelatinized, poured into a mold, and dried. The dried material is formed into pieces and hydrated into aquagels. These procedures are described in detail, below.

In the case of agar, agar powder is mixed with water and heated to cause the agar to dissolve and form a moderately viscous solution. The solution is treated to form the aquagels in the desired shape, for example, by injecting the agar solution into a water-immiscible liquid to form aquagels spheres. These procedures are described in detail, below.

In the case of alginic acid, alginic acid powder is mixed with water, injected or mixed into a calcium ion-containing solution to form an aquagel.

The aquagels may be prepared in various shapes, including spheres, particles or pieces, as described in detail, below.

Formation of Aquagels Using High Amylose Starch. High amylose starch is mixed with sufficient water to disperse the starch and allow for gelatinization of the starch to occur and sufficient to form an aquagel subsequent to gelatinization. Generally, the operative range of concentration of high amylose starch to initial water is about 1% to 20%. The preferred range is about 5 to 8% starch. The most preferred concentration is about 8% starch. The aqueous dispersion of starch is treated to gelatinize the starch, that is, to cause the starch granules to swell and hydrate and cause solubilization of the starch molecules, thereby disrupting the molecular order within the granules. Generally, this is accomplished by mixing and heating the starch solution at or above the gelatinization temperature of the starch for a time sufficient to achieve gelatinization. One way to determine gelatinization is to observe the loss of the starch birefringence. Another way is to measure viscosity of the heated starch-water mixture. Viscosity will increase to a maximum and decrease, indicating gelatinization has occurred.

Next, the gelatinized starch is treated to obtain the desired form of the aquagel, such as spheres, particles or pieces. Then, the gelatinized starch spheres or other shaped units are cooled or aged to bring about gelation. Gelation is used herein to describe the process of rigidity development (solidification) wherein the gelatinized starch sets into a firm, rigid aqueous gel, denoted as an aquagel.

Spherical-shaped aquagels can be formed by injecting the gelatinized starch as a hot starch melt through an orifice into oil or other liquid that is immiscible with water. The gelatinized starch spheres are cooled or aged to obtain firm aquagels. It is preferred that the liquid is chilled to cool the starch spheres and augment the formation of aquagels. The spheres are collected such as by filtration, decantation, centrifugation or other known method. Residual oil is removed from the spheres using detergent or organic solvent, e.g., hexane, washes. The starch aquagel spheres can be used directly or stored in water, preferably in the refrigerator, for future use. The aquagels are used to make lightweight concrete as described below.

The size of the spheres is determined by the temperature of the melt, the injection pressure, and the size of the orifice through which the melt is injected. Sphere size is chosen based on the desired ultimate use of the concrete which is to be prepared using the spheres. Since sphere size can affect the porosity (size and number of pores) in the final concrete product and thus plays a role in concrete density and strength, sphere size is selected based on the properties desired in the final concrete product. Optimum sphere size can be readily determined by routine experimentation such as by carrying out a trial batch.

Other shaped aquagels can be prepared by pouring the aqueous gelatinized starch into molds having the desired shape, as known to those of skill in the art. Methods of using starch aquagels in the preparation of lightweight concrete are described in detail below.

Formation of Aquagel Spheres Using Agar. Agar powder is mixed with sufficient water to disperse the agar and allow for dissolution of the agar to occur and sufficient to form an aquagel subsequent to dissolution of the agar. Generally, the operative range of concentration of agar to initial water is about 0.25 to 5%. The preferred range is about 1 to 3% agar, and the most preferred concentration is about 2% agar.

The agar mixture is heated to bring the mixture to boiling, thereby causing the agar to dissolve forming a moderately viscous solution. The agar solution is treated to obtain the desired form of the aquagel. For example, spheres can be formed as described above, namely, by injecting the agar solution into oil or other water-immiscible liquid to form spheres. Again, it is preferred that the water-immiscible liquid be chilled to cool the spheres and augment the formation of the aquagel spheres. The spheres are collected and washed to remove residual oil or other immiscible liquid as described above. The agar spheres can be used directly or stored in water, preferably in the refrigerator, for later use. If stored in water, excess water is removed from the spheres by filtration, decantation, centrifugation or other known method, prior to using to make lightweight concrete. Methods of using agar aquagels in the preparation of lightweight concrete are described in detail below.

Formation of Aquagel Pieces Using Wheat Starch. Wheat starch is mixed with sufficient water to disperse the starch and allow for gelatinization of the starch to occur and sufficient to form an aquagel subsequent to gelatinization. Generally, the operative range of concentration of wheat starch to initial water is about 1% to 50%. The maximum amount of starch to initial water that can be properly mixed while heating can be dependent on the mixing vessel. Use of an extruder to gelatinize starch allows for greater concentrations of starch. If gelatinization is carried out in an open vessel, the upper limit of starch to initial water for proper mixing during heating is about 20%. The preferred range is about 6 to 10% starch. The most preferred concentration is about 8% starch. The aqueous dispersion of starch is treated to gelatinize the starch as described above.

We have found that a preferred way to form aquagels from wheat starch for use to prepare lightweight concrete is to pour the gelatinized starch into a mold or sheet and age or cool the gelatinized starch. Next, the starch is dried for a time sufficient to remove at least about 95% of the moisture to form a hard, dry material. The material is treated to obtain particles or pieces, such as by grinding, milling or other known process. The size of the dry particles or pieces is selected based on the size of the desired aquagel to be used in making concrete. Generally, for most concrete purposes, the material is treated to obtain particles that average no more than about 5 min. The preferred size is about 1–2 min.

Aquagels are formed by hydrating the particle. The particles may be hydrated immediately, or alternatively, the particles can be stored, shipped to the point of use without hydration, and hydrated later.

Hydration of the particles is carried out by maintaining the particles in water for a time sufficient for the starch particles to take up water and form aquagels, for example, by soaking in water. One way to determine if a starch particle is hydrated is to weigh a test particle. When the particle no longer increases in weight, then it is determined to be fully hydrated. The hydrated starch forms a firm aquagel which is used to make concrete.

In the case of alginic acid, alginic acid powder is mixed with water, injected or mixed into a calcium ion-containing solution to form an aquagel.

PREPARATION OF CONCRETE USING AQUAGELS

Concrete is prepared using aquagels as follows. The aquagels prepared as described above are mixed into a concrete mix as all, substantially all or a part of the aggregate in the mix. The cement sets around the aquagels, thus, the aquagels maintain the formation of the pores during the stage when the concrete becomes firm. During the stage when the moisture migrates out of the concrete and the aquagels, e.g., the curing and/or drying stages, the aquagel loses moisture, shrinks, and eventually dries up to form a dried bead or particle that is a fraction of the size of the original aquagel, the dried aquagels bead or particle being located within a cell or pore that was formed by a "wet" aquagel. This results in lightweight concrete.

In an alternate embodiment, the moisture is maintained in the aquagels in the concrete.

The aquagels of the invention are mixed with any concrete mix which is suitable to obtain the final concrete product. The term concrete mix includes known cements such as portland cement, or cement and sand, or cement and crushed stone or such mixes with other typical concrete mix ingredient as known in the art. Water is added as needed to provide workable consistency and to meet strength, durability, and other desired requirements. The selection of the appropriate water/cement ratio is well described in the art. The appropriate ratios can be determined by carrying out murine trial batches. Other optional ingredients in the aquagel-cement mixture are concrete aggregate materials, for example, lightweight aggregates composed of natural or synthetic materials such as expanded clay or shale, perlite (volcanic glass), expanded vermiculite or pumice. Admixtures can also be included. An admixture is defined in the art as "a material other than water, aggregates and hydraulic cement that is used as an ingredient of concrete or mortar and is added to the batch immediately before or during its mixing" (*Cement*, supra, page 166).

The ratio of aquagel spheres or other shaped aquagel particles to cement in the concrete mix is selected based on the ultimate application of the final concrete product. For example, for a structural use, the upper limit of aquagels in the concrete mix must not be so great as to compromise the structural integrity of the concrete product for its intended purpose. The Examples, below, show properties of concrete prepared from selected materials. Correlation between aquagel concentration and the strength and density of the concrete can be readily determined by routine experimentation. One method is to prepare concrete samples having different quantities of aquagels, and to make a graph of the concentration versus strength and density. A concrete sample having the desired strength and density can then be readily determined by extrapolation from the graph.

As stated above, it is a critical feature of the invention that the aquagel have sufficient firmness to withstand the shear forces that are generated when the concrete mix and aquagels are mixed to form the concrete, that is, the aquagels are sufficiently firm to remain substantially intact during mixing such that the aquagels maintain the formation of pores or cells during the initial set stage wherein the concrete becomes firm.

Next, the concrete mix plus aquagels is poured into molds or otherwise applied for its intended purpose. The cement is allowed to set around the aquagels, thus, the aquagels maintain the formation of the pores during the stage when the concrete becomes firm. During the curing and/or drying stages, the moisture migrates out of the concrete and the aquagels; as an aquagel loses moisture, it shrinks, and eventually dries up to form a dried particle that is a fraction of the size of the original aquagel in the cell or pore in the concrete. This results in lightweight concrete.

If desired, the size and/or uniformity of the pores or cells in the concrete can be regulated by preparing the concrete using aquagels having a desired size and/or uniformity.

Compositions prepared in accordance with this method of the invention have reduced density, reduced weight, reduced thermal conductivity, and reduced sound transmission compared to concrete prepared without using aquagels. Because the aquagels in the concrete mix maintain the pore structure of the concrete mix while the cement while sets, a concrete product can be obtained that has substantially uniform density regardless of depth (see Table 9, below).

The concrete compositions have a high initial moisture content, and, after curing and drying, have substantially uniform density, and reduced density, reduced weight, reduced thermal conductivity, and reduced sound transmission compared to concrete compositions prepared without using aquagels. Thus, the invention provides lightweight, cellular concrete that can be used for a multitude of purposes. These include use for lightweight concrete blocks, for insulating concretes, for steel fireproofing, for structural concrete, for roofing or flooring, for making green wall, for insulated sidewalks or patio decks, or for coating on other concrete surfaces to reduce evaporation of the underlying concrete.

The initial concrete mix containing aquagels has a high moisture content. As discussed above, this can be advantageous for certain applications. Concrete having a high initial moisture content will dry more slowly than regular concrete. This can be an advantage where the concrete is poured in hot, dry conditions that cause normal concrete to dry too quickly. The high moisture concrete would remain cooler due to evaporative cooling and would not dry out so quickly. Concrete that dries too quickly does not cure properly. Other applications for which a high initial moisture content may be advantageous will be apparent to those of skill in the art.

In an alternate embodiment, the moisture is maintained in the aquagels in the concrete, for use in those applications where maintaining the high moisture content is desirable.

EXAMPLES

The following examples are intended only to further illustrate the invention and are not intended to limit the scope of the invention which is defined by the claims.

Example 1

This example describes a procedure for making and testing concrete samples containing high amylose starch spheres.

High amylose corn starch solutions (8%, w/w) were heated at 2° C./min in a 1000 ml pressure reactor (Paar Instrument Co., Moline, Ill.) equipped with a mixer and controller (Model 4843). The solutions were mixed at 330 rpm and heated to 140° C. The solutions were then cooled to 75° C. using an internal cooling coil and injected into a 10 l container of chilled (10° C.) vegetable cooking oil. The container of cooking oil was rotated at approximately 15 rpm during the injection process. The starch solution was injected at a pressure ranging from 10 to 20 psi through a manifold containing four needles (23G1). The starch solution formed into spherical aquagels of 1–3 mm in diameter. The vessel of chilled oil which contained the spherical starch gels was placed in a refrigerator overnight. The spherical starch aquagels were removed from the oil by filtering through a funnel and filter paper. Any remaining oil was removed from the spherical gels by washing (three washes) in hexane. The spheres were then stored in distilled water until further use.

Concrete was prepared from Portland Cement (Type I-II, RMC Lonestar, Pleasanton, Calif.), high amylose starch aquagel spheres, and distilled water in the ratios listed in Table 2. A Hobart mixer model A.200 (Hobart Manufacturing Co., Troy, Ohio) was used to mix the concrete. The mixing bowl was first rinsed with distilled water and drained. The cement was added to the mixing bowl first followed by approximately three fourths of the measured water. The contents were mixed at 46 rpm until homogenous (approximately 2 minutes). The spherical aquagels were drained of the free water and weighed before being added to the mixing bowl. The remaining water was added, and the contents were mixed for two minutes. The consistency of the concrete was such that it could be made to flow into the mold only by vibration (Jumbo Vibrator, Model H, Wahl Clipper Corp. Sterling Ill.).

Cylindrical concrete samples. Methods developed for curing and testing the cylindrical concrete samples are in accordance with ASTM methods C567 and C-39. The cylindrical concrete samples were made by filling cylindrical plastic molds (6 inches in length and 3 inches diameter) and affixing a plastic lid after striking-off the mold surface to make it flush with the top of the mold. Plastic density was measured as the density of the wet concrete in the plastic cylindrical molds. The concrete cylinders were removed from the molds after 7 days and stored for 21 days at 73.4° F.±3° F. and 50%±5% relative humidity to facilitate curing. Cured density was determined for each cylinder by measuring weight and volume. Oven-dry density was determined for some samples by heating (105° to 110° C.) for 72 hours before cooling and measuring weight and volume. The compressive strength of cured samples was determined by capping the cylinders and compressive them until failure occurred as specified in ASTM method C-39.

Slab concrete samples. Slab concrete samples were made by filling plastic molds (7.5 inches in length, 7.5 inches in width, 1 inch in thickness) using a vibrator as described above. The concrete samples were cured and oven-dried as described for cylindrical samples. The thermal conductivity of the oven-dry samples was determined according to ASTM method C-177. Thermal conductivity was measured with a Guarded Hot Plate Thermal Conductivity Instrument (Model GP-500, Sparrell Engineering, Damariscotta, Me.).

Control concrete samples were prepared without the addition of aquagels. The control samples are denoted as "all cement" in the Tables.

Results. Photographs of the concrete structure revealed a random distribution of air pockets and voids throughout the cured concrete sample prepared without using aquagels spheres (control samples). In contrast, when starch aquagel spheres were added to the concrete in increasing proportions, the occurrence of a uniform distribution of spherical voids was observed throughout the samples. It is apparent from the photographs that the cement first sets around the starch spheres. During the curing process, the starch aquagel begins to shrink as moisture moves out of the aquagel sphere. Eventually the starch sphere can dry to a small, hard bead with considerable void space surrounding it (see FIG. 1).

The high amylose starch aquagel spheres were useful in reducing the density and thermal conductivity of concrete. As shown in Tables 1 and 2, the plastic density (wet cement) and the cured density (hardened for 28 days) became less dense (lighter) with increasing amounts of the aquagel spheres. The oven-dry density (removal of all free water) is a measure of how low the density could possible go. It also became less dense (lighter) with increasing amounts of the aquagel spheres. The cured strength decreased with increasing amounts of starch spheres in the concrete mixture, however, the compressive strength was still sufficient for many applications. Thermal conductivity also decreased with increasing amounts of starch spheres, thus improving the insulation properties of the cement. It was interesting to note that concrete containing 0.014 g/cm$^3$ of starch had a reduction in density and thermal conductivity without decreasing the cured strength. The cured strength dropped sharply with starch contents greater than 0.014 g/cm$^3$.

The starch spheres were composed of only 8% starch and consequently resulted in only a small percentage of starch in the final concrete product (Tables 1–2) even though some samples contained quantities of starch spheres as high as 45 percent by weight.

The materials cost per volume of concrete generally decreased with increasing proportions of starch. The materials cost ranged from $103 to $132/yd$^3$ with the cost of $128/yd$^3$ for concrete containing no starch.

It should be noted that samples cured in high humidity conditions (100% relative humidity) did not decrease appreciably in density during the curing period (data not shown). These samples had compressive strengths comparable to samples cured at 50% relative humidity even though they contained as much as 0.5 g/cm$^3$ of free water in the concrete sample.

TABLE 1

Physical and mechanical properties of concrete containing varying amounts of high amylose starch spheres.

| Sample | Solids[1] g/cm$^3$ | Plastic Density[2] g/cm$^3$ | Cured Density[3] g/cm$^3$ | Oven-Dry Density[4] g/cm$^3$ | Cured Strength[5] (PSI) | Thermal Conductivity[6] (k) Btu-in/hr-ft$^2$-°F. |
|---|---|---|---|---|---|---|
| All cement | 0 | 2.16 | 2.09 | 1.95 | 8101 | 5.12 |
| High Amylose corn Starch | 0.014 | 2.00 | 1.93 | 1.75 | 8241 | 4.40 |
| High Amylose Corn Starch | 0.029 | 1.88 | 1.76 | 1.59 | 5413 | 3.90 |
| High Amylose corn starch | 0.040 | 1.69 | 1.40 | 1.32 | 2343 | 3.01 |
| High Amylose corn Starch | 0.057 | 1.58 | 1.20 | 1.06 | 1561 | 2.37 |

[1]Grams of dry starch contained in each cm$^3$ of concrete.
[2]Density of freshly prepared concrete.
[3]Density of concrete cured for 28 days as described in Example 1.
[4]Density of cured concrete after oven drying as described in Example 1.
[5]The force required to cause failure in samples cured for 28 days.
[6]The rate of heat conductance in samples as described in ASTM C-177.

TABLE 2

Proportions of cement, high amylose starch aquagel spheres, and water in five concrete samples and their material costs.

| Samples | Cement (grams) | Starch spheres[1] (grams) | Water (grams) | Water: Cement | Starch: Cement[2] | Starch Wt: Total Wt.[2] | Concrete Cost[3] $/yd$^3$ |
|---|---|---|---|---|---|---|---|
| All Cement | 6170 | 0 | 1728 | 0.28 | 0 | 0 | 128 |
| High Amylose Corn Starch | 5600 | 666 | 1377 | 0.25 | 0.0095 | 0.0070 | 132 |
| High Amylose Corn starch | 4800 | 1332 | 883 | 0.17 | 0.022 | 0.015 | 117 |
| High Amylose Corn Starch | 4000 | 2000 | 728 | 0.18 | 0.040 | 0.024 | 103 |
| High Amylose Corn Starch | 3180 | 2666 | 61 | 0.02 | 0.067 | 0.036 | 104 |

[1]Starch spheres contain 8% (w/w) high amylose corn starch.
[2]Dry starch basis as compared to starch spheres which contain only 8% dry starch.
[3]Material cost based on $0.045/lb of cement and $0.41/lb high amylose corn starch.

Example 2

This example describes a procedure for making and testing concrete samples containing agar spheres.

A suspension containing 2% (w/w) agar (Bacto-Agar, Difco Laboratories, Detroit, Mich.) in distilled water was heated at 2° C./min in a 1000 ml pressure reactor (Paar Instrument Co., Moline, Ill.) equipped with a mixer and controller (Model 4843). The suspension was mixed at 330 rpm and heated to 100° C. resulting in a homogenous solution. The solution was then cooled to 60° C. using an internal cooling coil and injected into a 10 l container of chilled (10° C.) vegetable cooking oil. The container of cooking oil was rotated at approximately 15 rpm during the injection process. The molten agar was injected at a pressure ranging from 10 to 20 psi through a manifold containing four needles (23G1). The molten agar formed into spherical aquagels of 1–3 mm in diameter. The aquagels were removed from the oil by filtering through a funnel and filter paper. The oil was removed from the spherical aquagels by washing three times in hexane. The aquagel spheres were then stored in distilled water until further use. The concrete samples were made and tested as described in Example 1, above.

Figure 2:
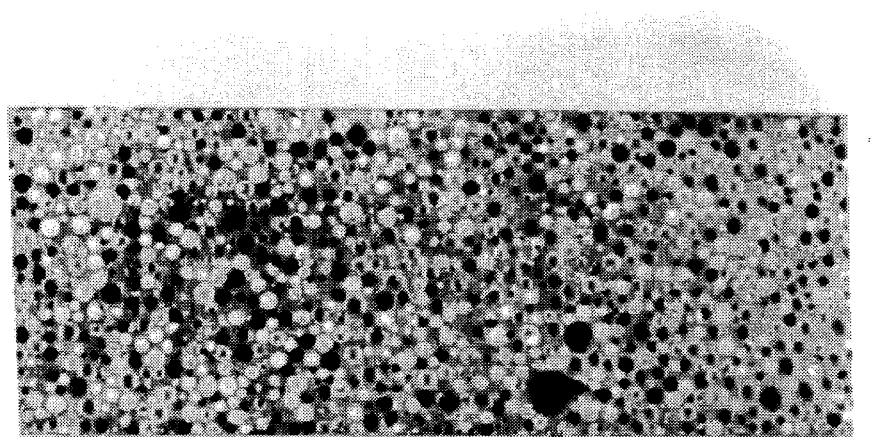
FIG. 2 is a photograph of a cross-sectional cut through concrete prepared using agar spherical aquagels in proportions given in Table 4, agar 4. The mechanical and physical properties of the concrete are shown in Table 3. The concrete has spherical voids left by agar aquagels that have dehydrated.

Results. The agar-based aquagel spheres formed very firm aquagels that could be readily handled and easily mixed without destroying their structure. Photographs of the concrete structure containing agar-based aquagels revealed a cellular concrete with well defined closed cells (FIG. 2). Small particles of dried agar were apparent within the cells of the concrete.

The concrete containing spheres of agar aquagels had much the same properties as the concrete containing aquagel spheres of high amylose corn starch (compare Tables 1 and 3). The plastic and cured densities were nearly identical for both treatments. However, the oven dry density of the concrete samples containing aquagels of agar was lower than that of concrete samples containing aquagels of high amylose corn starch. This would explain the lower thermal conductivity of the concrete samples containing agar. The cured strength of the agar-containing concrete samples was slightly lower than that of the concrete samples containing high amylose starch.

The quantity of agar needed to make spherical aquagels that could withstand concrete mixing was much lower than that needed in high amylose starch samples. However, due to the higher cost of agar relative to high amylose corn starch ($10 and $0.41, respectively), the material cost per yard was higher for samples containing agar.

TABLE 3

Physical and mechanical properties of concrete containing varying amounts of agar-based (2% w/w) aquagel spheres.

| Sample | Solids[1] g/cm$^3$ | Plastic Density[2] g/cm$^3$ | Cured Density[3] g/cm$^3$ | Oven-Dry Density[4] g/cm$^3$ | Cured Strength[5] (PSI | Thermal Conductivity[6] (k) Btu-in/hr-ft$^2$-°F. |
|---|---|---|---|---|---|---|
| All cement | 0 | 2.16 | 2.09 | 1.95 | 8101 | 5.12 |
| Agar 1 | 0.0036 | 2.03 | 1.97 | 1.73 | 7055 | 4.08 |
| Agar 2 | 0.0070 | 1.86 | 1.73 | 1.44 | 3766 | 3.39 |
| Agar 3 | 0.010 | 1.70 | 1.48 | 1.18 | 2119 | 2.60 |
| Agar 4 | 0.013 | 1.52 | 1.25 | 0.91 | 1441 | 1.94 |

[1] Grams of dry agar contained in each cm$^3$ of fresh concrete.
[2] Density of freshly prepared concrete.
[3] Density of concrete cured for 28 days as described in Example 1.
[4] Density of cured concrete after oven drying as described in Example 1.
[5] The force required to cause failure in samples cured for 28 days.
[6] The rate of heat conductance in samples as described in ASTM C-177.

TABLE 4

Proportions of cement, agar aquagel spheres, and water and the material costs of five concrete samples.

| Samples | Cement (grams) | Agar spheres[1] (grams) | Water (grams) | Water: Cement | Agar: Cement[2] | Agar Wt: Total Wt.[2] | Concrete Cost[3] $/yd$^3$ |
|---|---|---|---|---|---|---|---|
| All Cement | 6170 | 0 | 1728 | 0.28 | 0 | 0 | 128 |
| Agar 1 | 5600 | 666 | 1280 | 0.23 | 0.0024 | 0.0018 | 174 |
| Agar 2 | 4800 | 1332 | 900 | 0.19 | 0.0055 | 0.0038 | 215 |
| Agar 3 | 4000 | 2000 | 559 | 0.14 | 0.010 | 0.0061 | 250 |
| Agar 4 | 3180 | 2666 | 279 | 0.09 | 0.017 | 0.0087 | 282 |

[1] Agar spheres contain 2% (w/w) agar.
[2] Dry agar basis as compared to agar spheres which contain only 2% dry starch.
[3] Material cost based on $0.045/lb of cement and $10/lb agar.

Example 3

This example describes a procedure for making and testing concrete samples containing wheat starch aquagels.

Unmodified wheat starch (Midwest Grain Products, Atchison, Kans.) was suspended in water (8%, w/w) and heated at 2° C./min in a 1000 ml pressure reactor (Paar Instrument Co., Moline, Ill.) equipped with a mixer and controller (Model 4843). The suspension was mixed at 330 rpm and heated to 100° C. to gelatinize the starch. The starch melt was cooled to 90° C. using an internal cooling coil and poured into a rectangular tray (9"×9"×3"). The starch was covered with aluminum foil and stored in the refrigerator overnight (5° C.). The gelled starch was removed from the refrigerator and cut into slices approximately 1 cm in thickness. The gelled starch slices were placed on a tray and dried in a forced-air drier (80° C.) until no further decrease in weight could be detected. The dried starch had become transparent, hard, and brittle. The starch was then milled into fragments smaller than 2 mm which gave it the appearance of coarse sand.

The milled starch was soaked in tap water for 12 hours to allow full hydration. This resulted in aquagels. The hydrated starch aquagels contained approximately 25% starch and 75% water. The hydrated starch was very durable and was rinsed with excess water several times to remove and cold water soluble starch products. The hydrated starch aquagels were drained of excess water and utilized in making concrete samples. The procedure for making and testing the concrete samples was identical to that described in Example 1 only substituting aquagels (hydrated wheat starch fragments) for the aquagel spheres of high amylose corn. The amounts and proportions of the sample components are given in Table 6.

Figure 3:
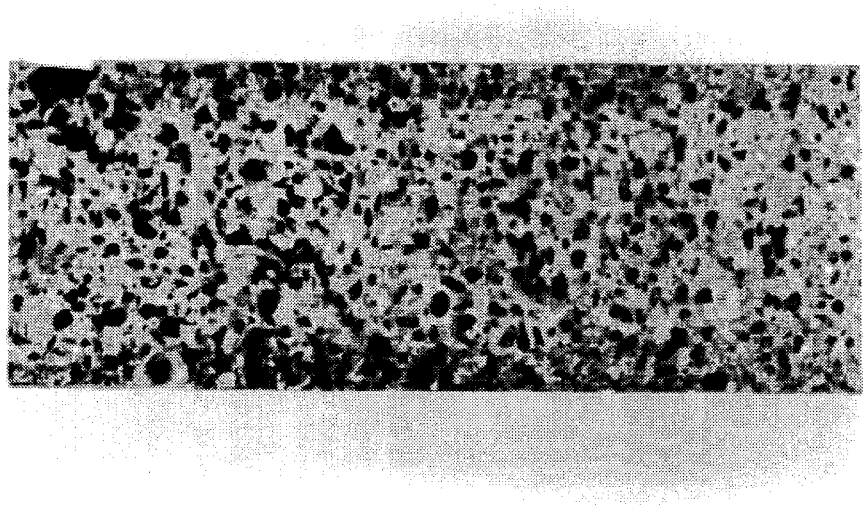
FIG. 3 is a photograph of a cross-sectional cut through concrete prepared using aquagels made from wheat starch fragments in proportions given in Table 6, wheat 4. The mechanical and physical properties of the concrete are shown in Table 5. The concrete has voids left by starch aquagels that have dehydrated. Note the small hardened fragments of starch remaining within the voids.

Results. The concrete samples prepared using the wheat starch fragment aquagels had similar plastic density, cured density and oven-dry density as concrete samples prepared using the same amount of high amylose corn or agar spheres (Table 5). The wheat starch fragments used in the concrete samples contained 25% starch whereas the high amylose corn starch and agar spheres used in Examples 1 and 2 contained only 8% and 2% solids, respectively. Thus, the total amount of solids (dry wheat starch) used in the concrete was approximately 3 and 10 times greater than the concrete samples containing high amylose corn starch spheres and agar, respectively (compare "Solids" column Tables 1, 3 and 5). Even though the quantity of "Solids" (starch) used in the concrete samples containing wheat starch fragments was higher than for the concrete samples containing high amylose corn starch and agar, the material cost was lower due to the low cost of wheat starch compared to the other materials (compare Tables 2, 4 and 6). The thermal conductivities and compressive strengths were relatively lower for the samples containing the wheat starch (compare Tables 1, 3 and 5). FIG. 3 shows a cross-sectional cut through the concrete sample prepared in the proportion given in Table 6, wheat 4.

TABLE 5

Physical and mechanical properties of concrete containing varying amounts of wheat starch-based (25% w/w) aquagel fragments.

| Sample | Solids[1] g/cm$^3$ | Plastic Density[2] g/cm$^3$ | Cured Density[3] g/cm$^3$ | Oven-Dry Density[4] g/cm$^3$ | Cured Strength[5] (PSI) | Thermal Conductivity[6] (k) Btu-in/hr-ft$^2$-°F. |
|---|---|---|---|---|---|---|
| All cement | 0 | 2.16 | 2.09 | 1.95 | 8101 | 5.12 |
| Wheat 1 | 0.042 | 1.97 | 1.90 | 1.61 | 4782 | 3.89 |
| Wheat 2 | 0.080 | 1.81 | 1.66 | 1.37 | 2224 | 2.89 |
| Wheat 3 | 0.12 | 1.69 | 1.47 | 1.21 | 1066 | 2.22 |
| Wheat 4 | 0.16 | 1.56 | 1.23 | 0.985 | 720 | 1.66 |

[1] Grams of dry starch contained in each cm$^3$ of fresh concrete.
[2] Density of freshly prepared concrete.
[3] Density of concrete cured for 28 days as described in Example 1.
[4] Density of cured concrete after oven drying as described in Example 1.
[5] The force required to cause failure in samples cured for 28 days.
[6] The rate of heat conductance in samples as described in ASTM C-177.

TABLE 6

Proportions of cement, wheat starch aquagel, and water and the material costs of five concrete samples.

| Samples | Cement (grams) | Starch Fragments[1] (grams) | Water (grams) | Water: Cement | Starch: Cement[2] | Starch Wt: Total Wt.[2] | Concrete Cost[3] $/yd$^3$ |
|---|---|---|---|---|---|---|---|
| All Cement | 6170 | 0 | 1728 | 0.28 | 0 | 0 | 128 |
| Wheat 1 | 5600 | 666 | 1600 | 0.29 | 0.030 | 0.0018 | 116 |
| Wheat 2 | 4800 | 1332 | 1375 | 0.29 | 0.069 | 0.0038 | 106 |
| Wheat 3 | 4000 | 2000 | 993 | 0.25 | 0.125 | 0.0061 | 102 |
| Wheat 4 | 3180 | 2666 | 638 | 0.20 | 0.210 | 0.0087 | 96 |

[1] Wheat fragments contain 25% (w/w) starch.
[2] Dry starch basis as compared to hydrated starch fragments which contain only 25% dry starch.
[3] Material cost based on $0.045/lb of cement and $0.14/lb wheat starch.

Example 4

Concrete samples containing a commercial lightweight aggregate (perlite) were made to compare cost and properties with concrete samples containing aquagels. The perlite used (NC 30/50, Nor Cal Perlite, Richmond, Calif.) consisted of fine granules that would pass a 22 mesh screen but not a 48 mesh screen. The perlite was added to cement in the proportions given in Table 8. The concrete was mixed, poured into molds, cured and tested as described in Example 1.

Results. The perlite samples tended to shrink during the curing process with the amount of shrinkage being proportional to the percentage of perlite. The plastic and cured densities of the four perlite samples were similar to those of the aquagels tested (compare Tables 1, 3, 5, 7). The oven-dried densities were slightly lower for the perlite samples than the concrete made from various aquagels. The perlite samples maintained a slightly higher cured strength and had among the lowest values for thermal conductivity.

Figure 4:
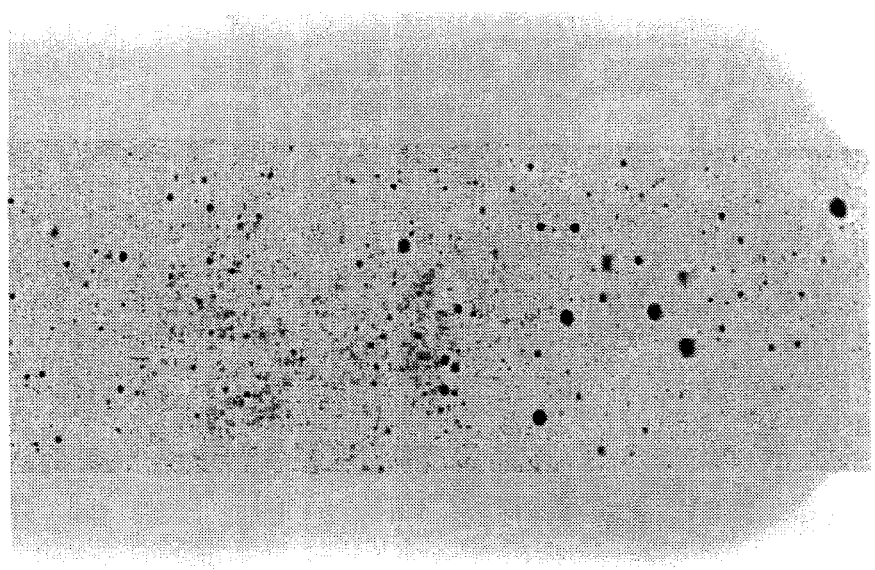
FIG. 4 is a photograph of a cross-sectional cut through concrete prepared using perlite in proportions given in Table 8, perlite 4. The mechanical and physical properties of the concrete are shown in Table 7. The concrete has small voids formed from the perlite.

FIG. 4 is a photograph of a cross-sectional cut through concrete prepared using perlite in proportions given in Table 8, perlite 4. The concrete has small voids formed from the perlite.

The solids content of the perlite concrete was comparable to that of the concrete samples containing wheat starch fragments and was higher than the solids content for the other aquagels tested (compare Tables 1, 3, 5, 7). The cost of materials per cubic yard of concrete decreased by adding perlite compared to the sample containing all cement (Table 8). The cost of concrete containing perlite was comparable to that of concrete containing starch aquagels with similar plastic densities (compare Tables 2, 6, 8).

TABLE 7

Physical and mechanical properties of concrete containing varying amounts of perlite.

| Sample | Solids[1] g/cm$^3$ | Plastic Density[2] g/cm$^3$ | Cured Density[3] g/cm$^3$ | Oven-Dry Density[4] g/cm$^3$ | Cured Strength[5] (PSI) | Thermal Conductivity[6] (k) Btu-in/hr-ft$^2$-°F. |
|---|---|---|---|---|---|---|
| All cement | 0 | 2.16 | 2.09 | 1.95 | 8101 | 5.12 |
| Perlite 1 | 0.015 | 2.04 | 1.98 | 1.77 | 8264 | 4.53 |
| Perlite 2 | 0.061 | 1.66 | 1.55 | 1.44 | 4137 | 3.29 |

TABLE 7-continued

Physical and mechanical properties of concrete containing varying amounts of perlite.

| Sample | Solids[1] g/cm$^3$ | Plastic Density[2] g/cm$^3$ | Cured Density[3] g/cm$^3$ | Oven-Dry Density[4] g/cm$^3$ | Cured Strength[5] (PSI) | Thermal Conductivity[6] (k) Btu-in/hr-ft$^2$-°F. |
|---|---|---|---|---|---|---|
| Perlite 3 | 0.108 | 1.59 | 1.41 | 1.14 | 3584 | 2.32 |
| Perlite 4 | 0.155 | 1.51 | 1.27 | 0.90 | 2140 | 1.60 |

[1]Grams of dry perlite contained in each cm$^3$ of fresh concrete.
[2]Density of freshly prepared concrete.
[3]Density of concrete cured for 28 days as described in Example 1.
[4]Density of cured concrete after oven drying as described in Example 1.
[5]The force required to cause failure in samples cured for 28 days.
[6]The rate of heat conductance in samples as described in ASTM C-177.

TABLE 8

Proportions of cement, perlite, and water and the material costs of five concrete samples.

| Samples | Cement (grams) | Perlite (grams) | Water (grams) | Water: Cement | Perlite: Cement | Perlite Wt: Total Wt. | Concrete Cost[1] $/yd$^3$ |
|---|---|---|---|---|---|---|---|
| All Cement | 6170 | 0 | 1728 | 0.28 | 0 | 0 | 128 |
| Perlite 1 | 6000 | 120 | 1847 | 0.31 | 0.020 | 0.015 | 123 |
| Perlite 2 | 5000 | 500 | 2653 | 0.53 | 0.10 | 0.061 | 101 |
| Perlite 3 | 5000 | 1000 | 3224 | 0.64 | 0.20 | 0.108 | 106 |
| Perlite 4 | 4560 | 1575 | 4052 | 0.89 | 0.35 | 0.155 | 106 |

[1]Material cost based on $0.045/lb of cement and $0.14/lb for perlite (.088 g/cm$^3$).

EXAMPLE 5

This example shows that a concrete product prepared using aquagels has substantially uniform density regardless of the depth. Concrete was prepared using aquagels (wheat starch fragments, Table 6, formulation "wheat 3"). The concrete was poured to a depth of ten feet, allowed to set, and then cut into six inch sections. The concrete was then cured and oven dried as described in Example 1, above. Results. The oven-dry density of concrete samples is given in Table 9. The average density of the concrete samples was 1.33 g/cm$^3$ with a standard deviation of 0.0073 g/cm$^3$.

TABLE 9

| Sample | Depth (ft) | Density (g/cm$^3$) |
|---|---|---|
| 1 | 0.5 | 1.34 |
| 2 | 1.0 | 1.32 |
| 3 | 1.5 | 1.31 |
| 4 | 2.0 | 1.32 |
| 5 | 2.5 | 1.32 |
| 6 | 3.0 | 1.32 |
| 7 | 3.5 | 1.32 |
| 8 | 4.0 | 1.32 |
| 9 | 4.5 | 1.32 |
| 10 | 5.0 | 1.32 |
| 11 | 5.5 | 1.33 |
| 12 | 6.0 | 1.33 |
| 13 | 6.5 | 1.33 |
| 14 | 7.0 | 1.33 |
| 15 | 7.5 | 1.33 |
| 16 | 8.0 | 1.33 |
| 17 | 8.5 | 1.34 |
| 18 | 9.0 | 1.33 |
| 19 | 9.5 | 1.33 |
| 20 | 10.0 | 1.33 |

It is understood that the foregoing detailed description is given merely by way of illustration and that modification and variations may be made within without departing from the spirit and scope of the invention.

What is claimed is:

1. A concrete composition having a solid matrix having cells or pores produced by a process comprising mixing together a mixture comprising cement, water, and aquagels to form concrete, said aquagels having sufficient firmness to withstand shear forces that occur during mixing of said mixture and wherein said aquagels maintain formation of said pores or cells in said mixture during an initial cement set stage when the concrete becomes firm.

2. The concrete composition of claim 1, wherein said concrete composition is cured with drying after said initial set stage to produce lightweight, cellular concrete.

3. The concrete composition of claim 1, wherein said aquagels are prepared from starch, agar, or alginic acid.

4. A method of preparing a concrete composition having a solid matrix having cells or pores, which comprises mixing together a mixture comprising a binder phase comprising cement, an aggregate phase comprising aquagels, and water to form concrete, said aquagels having sufficient firmness to withstand shear forces that occur during mixing of said mixture and wherein said aquagels maintain formation of said pores or cells in said mixture during an initial cement set stage when the concrete becomes firm.

5. The method of claim 4, which further includes curing said concrete composition with drying to produce a lightweight, cellular concrete.

6. The method of claim 4, wherein said aquagels are prepared from starch, agar, or alginic acid.

7. A concrete composition, which upon curing and drying produces lightweight cellular concrete, said composition comprising a mixture of a binder phase comprising cement, an aggregate phase comprising aquagels, and water, said aquagels having sufficient firmness to withstand the shear forces that occur during mixing of said mixture and wherein said aquagels maintain formation of said pores or cells in said mixture during an initial cement set stage when the concrete becomes firm.

8. The concrete composition of claim 7, wherein said aquagels comprise substantially all of the aggregate phase.

* * * * *